UNITED STATES PATENT OFFICE.

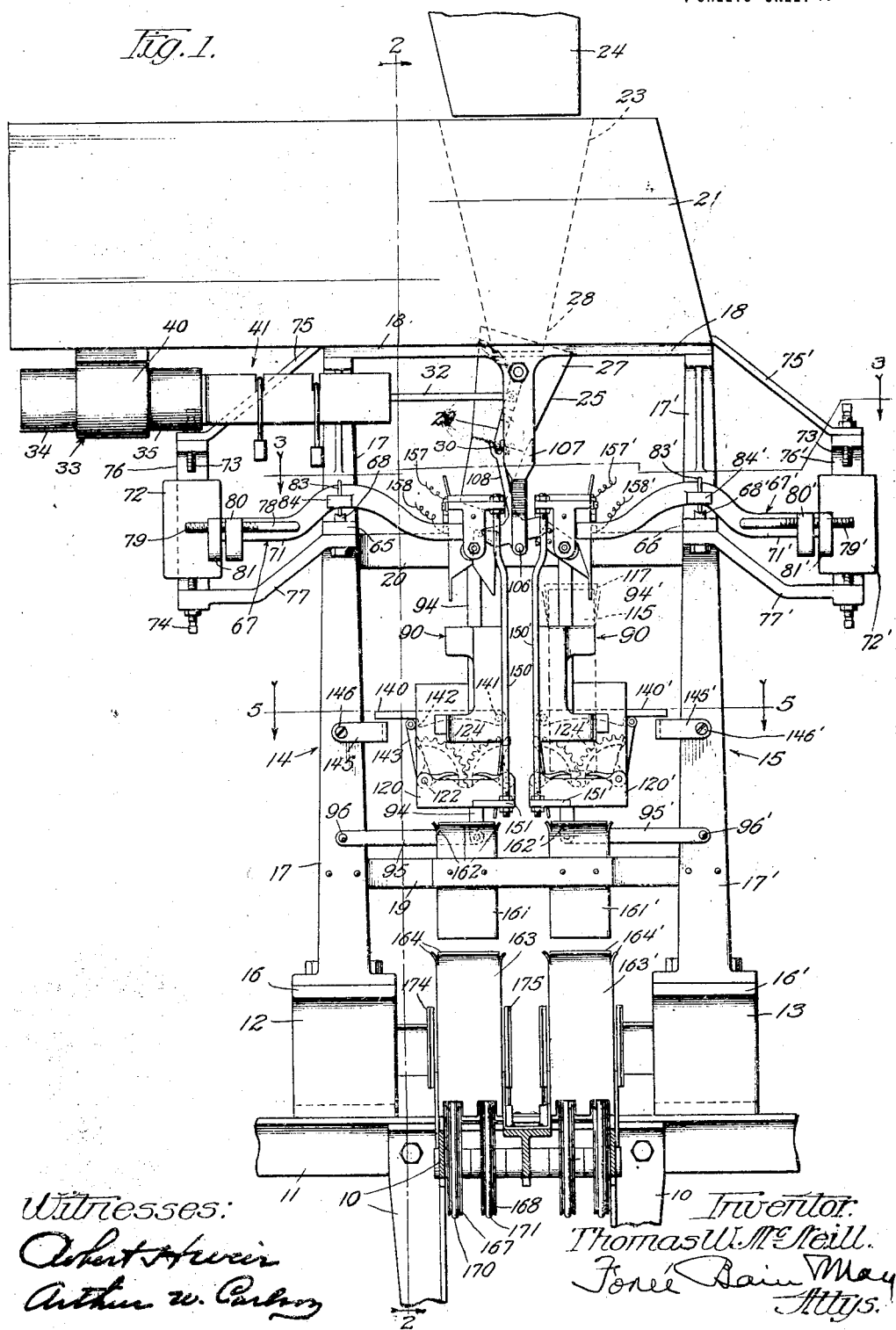

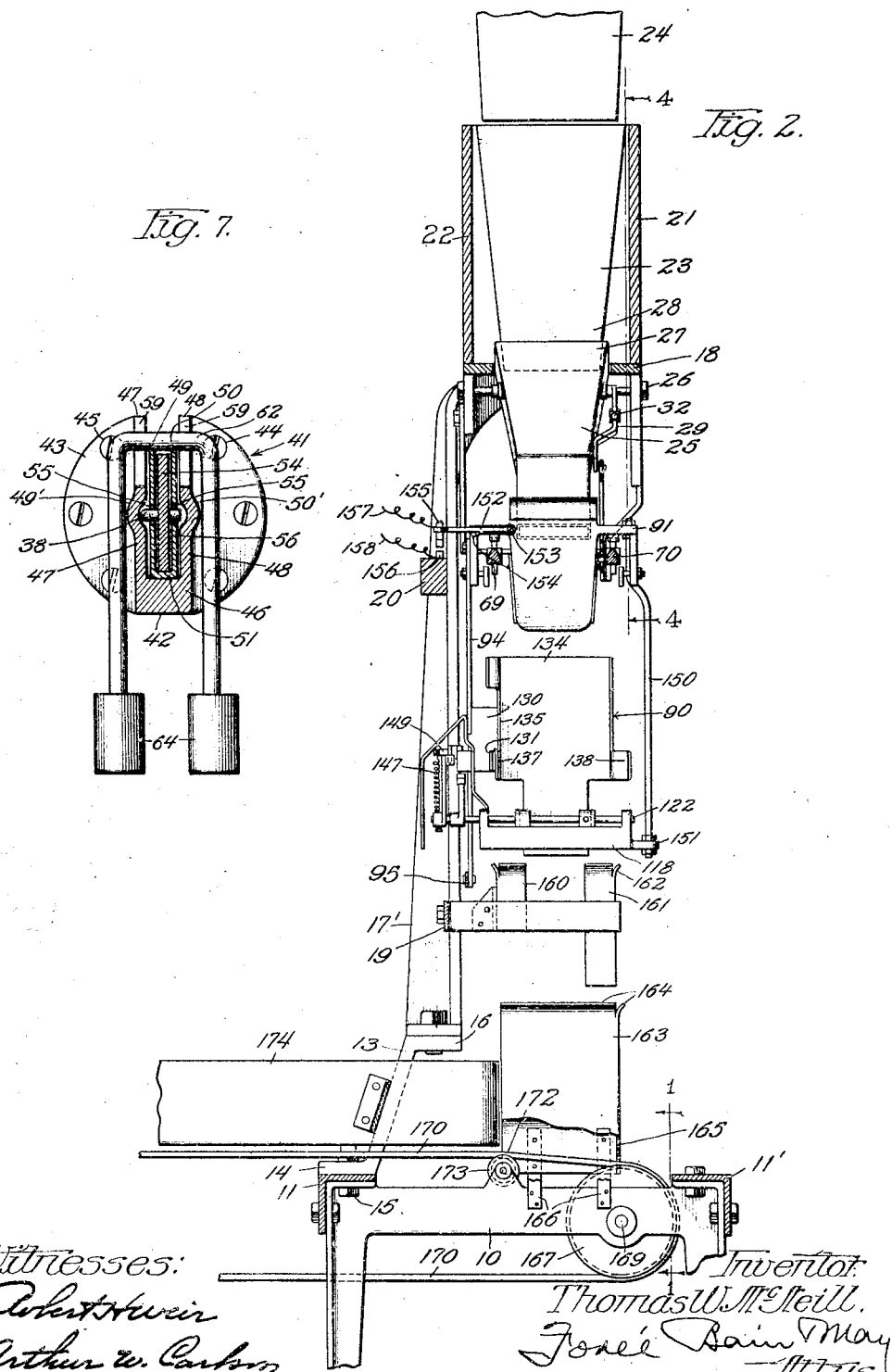

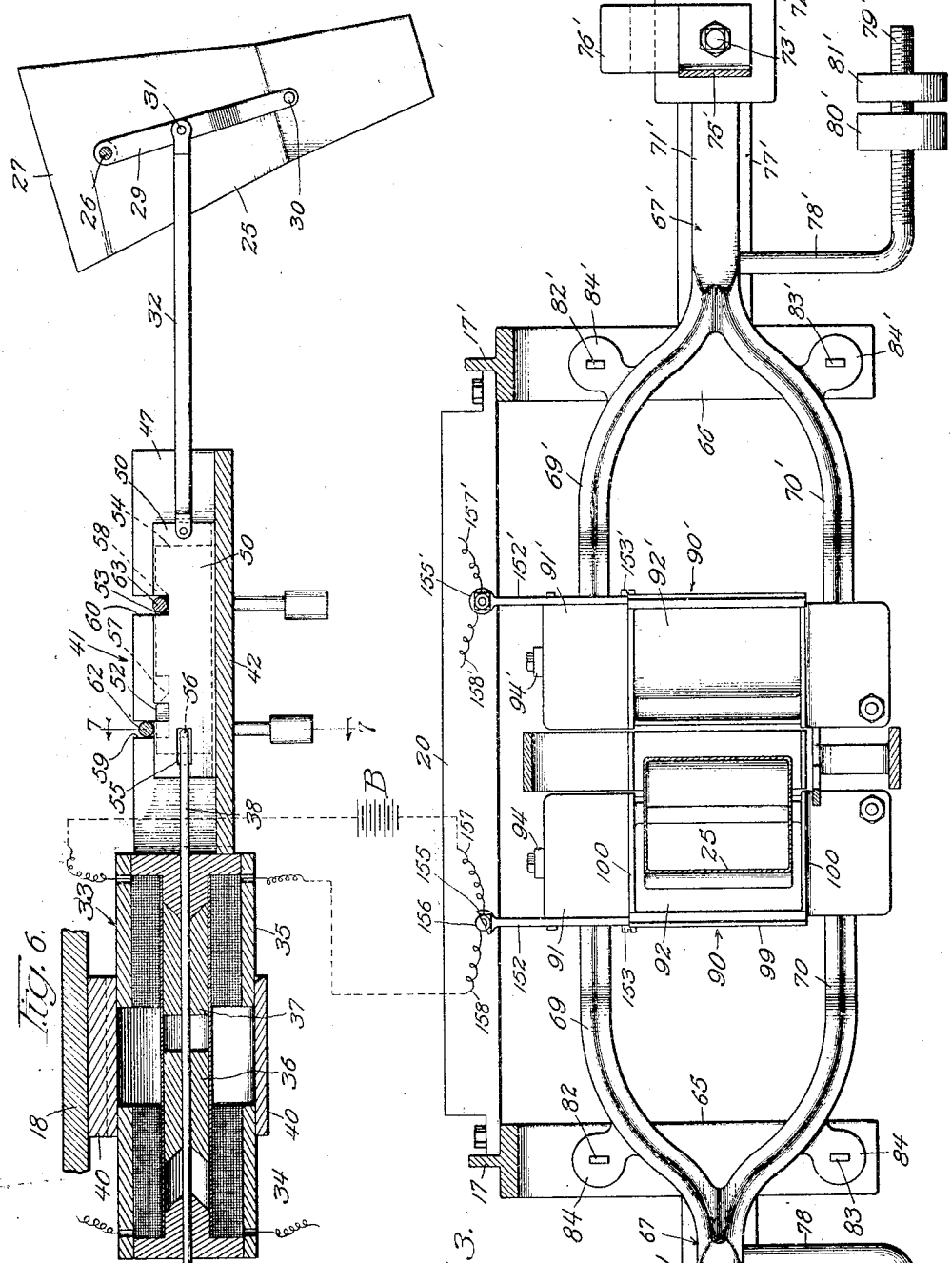

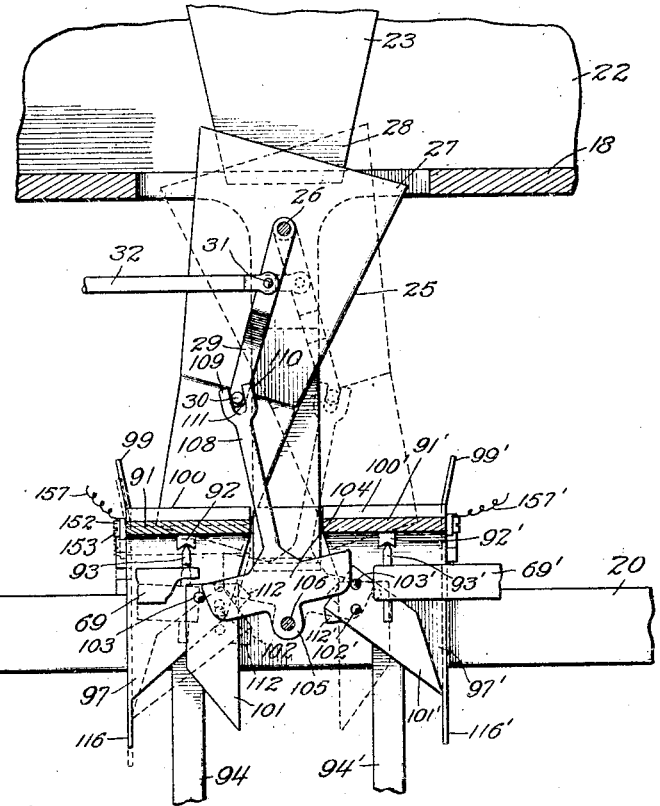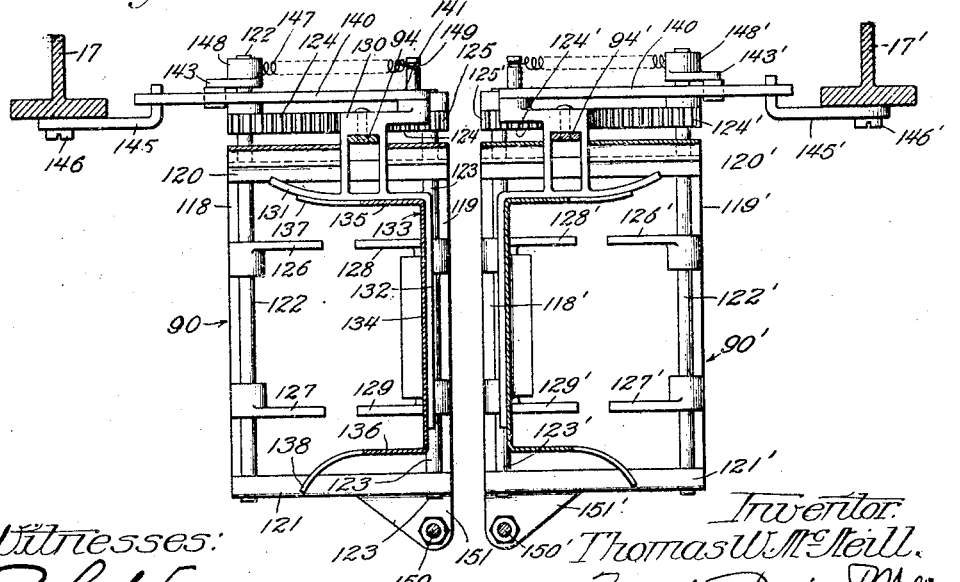

THOMAS W. McNEILL, OF CHICAGO, ILLINOIS, ASSIGNOR TO REID, MURDOCH & COMPANY, OF CHICAGO, ILLINOIS, A CORPORATION OF ILLINOIS.

FILLING AND WEIGHING MACHINE.

1,258,029.      Specification of Letters Patent.      Patented Mar. 5, 1918.

Application filed January 26, 1917. Serial No. 144,762.

*To all whom it may concern:*

Be it known that I, THOMAS W. MCNEILL, a citizen of the United States, residing at Chicago, in the county of Cook and State of Illinois, have invented certain new and useful Improvements in Filling and Weighing Machines, of which the following is a specification.

My invention relates to machines for filling and for automatically weighing cartons and their contents.

One of the objects of my invention is to provide a machine that will automatically fill a carton, weigh it and its contents and convey it, so filled, to a distant point, away from the filling and weighing mechanism.

Another object of my invention is generally to improve machines of this character.

Other and further objects of my invention will become readily apparent, to persons skilled in the art, from a consideration of the following description when taken in conjunction with the drawings, wherein:—

Figure 1 is a front elevation, showing parts in section taken on line 1—1 of Fig. 2, of the illustrated machine.

Fig. 2 is a vertical section taken on line 2—2 of Fig. 1.

Fig. 3 is an enlarged section taken on line 3—3 of Fig. 1.

Fig. 4 is a section taken on line 4—4 of Fig. 2.

Fig. 5 is a transverse section taken on line 5—5 of Fig. 1.

Fig. 6 is a central longitudinal section of the electro-magnetic motor for shifting the filling funnel.

Fig. 7 is an enlarged transverse section taken on line 7—7 of Fig. 6.

In all the views the same reference characters are employed to indicate similar parts.

In the preferred embodiment of my invention, which I have illustrated by the accompanying drawings, there are two, like, weighing instrumentalities and an oscillatable chute or pivoted funnel, shiftable to one carton filling and weighing mechanism by the effect of the mechanism employed to weigh the other carton and contents, so that while one carton is being filled, and weighed, on one side, by one of the filling and weighing instrumentalities, an empty carton is being emplaced by the attendant on the other side of the machine, thus rapidly taking care of the commodity, such as raisins, currants, or other like material, that may be fed to the machine in a substantially constant stream.

The cartons, in which raisins, or the like, are to be contained, are made of cardboard and lined with a relatively thin water-proof paper, and when presented to the machine to be filled and weighed, the bottom end is closed, leaving the paper lining projecting beyond the other end of the carton, the edges of which are practically in the same transverse plane as are the free edges of the cardboard flaps of the box, or carton. In handling the cartons, prior to filling, the lining is frequently distorted, or contracted at its open end, requiring opening out, to prevent the fruit from being deposited between the lining and body of the carton, before presenting the carton to the filling chute.

The Federal requirements regarding exactness and uniformity of weight of food products packed in receptacles, such as cartons, or the like, are very strict, and furthermore, the weight of the contents is required to be printed upon the outside of the carton, which renders it an easy matter for the consumer to check the weight of the contents. It therefore imposes upon the purveyor of such articles the necessity for great care. Overweight of only a very small proportion of the required weight of each package will aggregate a very considerable amount in the vast number of such packages disposed of in a single season, by large dealers or packers, and underweight reflects upon the character and integrity of the packer, besides rendering him liable to the punishment provided for the violation of such laws.

Filling and weighing cartons by hand is too slow and tedious to be profitable.

My machine is exact in its determination of weight, rapid in its operations and reliable in the production of uniform results.

In the specific embodiment of my invention, as exemplified in the accompanying drawings, the machine is mounted upon a table comprising a plurality of bents 10, joined together by angle bars 11, 11', one at each upper corner of the bents, providing a flat upper surface, by the horizontal flange, or leg of the angle bar, upon which to mount the superposed mechanism. Mounted on the angle bar 11 are two inwardly-inclined brackets 12 and 13, each having an outwardly projecting base or foot 14, which is bolted to the flange of the bent and to the horizontal flange of the angle bar, as by means of bolts 15, thereby firmly securing the brackets to the upper surface of the angle bars. The bracket 12 supports a filling and weighing mechanism 14 and the bracket 13 supports an independent filling and weighing mechanism 15. These two mechanisms are as much alike as may be, with the exception that one may be termed a right hand machine and the other a left hand machine, made in accordance with this alternative, in order to get the filling and weighing mechanism as close together as may be. The parts which I will indicate by reference characters on the machine on the left hand side will in most instances, for convenience, be indicated by similar characters with an exponent prime (') for the machine on the right hand side.

Mounted upon the inwardly-directed foot 16, of the bracket 12, is a standard 17 and likewise a similar standard is mounted upon the foot 16' of the bracket 13. The two standards are connected together at their top ends by a plate 18. They are also connected together near their bottom ends by a strap or bar 19 and again they are connected together near the upper ends by a transversely extending bar 20. Mounted upon the plate 18 are two vertically parallel plates or walls 21 and 22, which are spaced apart and which extend laterally from the machine being described to accommodate another duplex machine of similar character, or to a fixed part of the building, to steady the machine. Located between the plates 21 and 22, is a fixed funnel, or tapered chute 23, into which the commodity being weighed and packed is received from the conduit 24. Immediately under the fixed funnel 23 is another, tapered oscillatable funnel 25 pivoted, as at 26, which swings freely upon its pivot and has its larger end 27 overlying the smaller end 28 of the relatively stationary funnel 23. The funnel 25 is adapted to be oscillated upon its pivot 26, from the position shown in full line in Fig. 4 to the position shown in dotted lines in said figure, and during this movement the upper end 27 of the funnel 25 is never removed from its position encompassing the lower end 28 of the relatively stationary funnel 23, so that at all times the contents of the funnel 23 may be deposited into the upper end 27 of the funnel 25. Secured to one side of the funnel 25, as at the pivotal point 26, and extending downwardly, is an arm 29, carrying on its lower end a laterally extending lug 30, and having pivoted thereto at a midway position, as at 31, a link 32, by means of which the funnel 25 is oscillated from one position to the other, as heretofore described.

An electric motor 33 is the means employed for shifting the funnel 25. The motor consists of two iron-clad solenoids 34 and 35, coaxially arranged and provided with a shiftable core member 36 and 37, which may, if desirable, be made in a single piece, or separately, as shown, and which is axially movable in said electro-magnets 34 and 35. A rod 38 passes through the axis of the electro-magnets and guided in the ends thereof, is secured to the core members 36 and 37, so as to be moved therewith. The motor 33, as a whole, is secured to the under surface of the plate 18 by means of an annular non-magnetic bracket 40, having an axial opening into the open ends of which the electro-magnets 34 and 35 project.

A locking mechanism 41, to positively lock and hold the parts moved by the electro-magnetic motor 33 in fixed positions and to prevent their movement by any extraneous influence, consists of a fixed guide member 42, having laterally extending flanges 43 and 44 by which it is secured to the end of the electro-magnet 35, as by screws 45. The slide guide 42 consists of a base 46 having vertically extending, parallel side walls 47 and 48, outwardly deflected, by preference, as at 49' and 50', to provide sufficient space for axial movement of the rod 38 therein. There are two slidable members within the fixed guide member 42, one within the other. The outer member consists of the U-shaped part providing vertical walls 49 and 50, joined by a transverse base wall 51. Each of the side walls, 49 and 50, is provided with a rectangular notch 52, which is bounded by vertical surfaces. This notch is more clearly shown in Fig. 6. Another spaced apart notch 53 is provided in the member 49—50, which is of the same character as the notch 52. A plate 54 is slidable between the members 49 and 50 and independently movable, to some extent, of said members, as limited by the slots 55, which are made in each of the members 49 and 50. The end of the rod 38 passes through a perforation made in the central slide member 54 and is provided with a part 56 that projects through the slot 55. The central slide member 54 is provided in its upper vertical edge with notches 57 and 58, which are located substantially the same distance apart, as are the notches 52 and 53, in the members 49 and 50. These notches, 57 and 58, are provided, each with one vertical wall and a tapering wall. The vertical walls are located at adjacent boundaries of the notches, while the tapered walls are located at the remote boundaries, as clearly shown in Fig. 6. The outer vertical members 47 and 48, are provided, each with notches 59 and 60. These notches are diametrically opposite and are of a depth equal to the depth of the notches 52 and 53 in the members 49 and 50. The notches 53 in the members 49 and 50, are shown to be in register with the notches 60 in the members 47 and 48. Extending transversely of the locking mechanism 41 is a U-shaped latch 62 and 63, one for each system of notches heretofore described. On the lower ends of the vertical legs of the U-shaped latch are secured weights 64. The transversely extending part 62 is adapted to drop into the notches when they are brought into register with the notches 59 or 60 made into the members 47 and 48.

In Fig. 6 the lower end of the shiftable funnel 25 is shown moved to the right, on the pivot 26, and the core 37 of the motor is in the solenoid 35. Now when the solenoid 34 is energized, the core 36 is pulled into the solenoid 34, thereby pulling the rod 38, which is connected to the central plate or member 54, the initial effect of which is to move the said slide member to the left, thereby raising the transverse latch member 63 out of the notches 53 in the members 49 and 50, by the inclined wall of the notch 58. While this is being done the end 56 of the rod 38 is passing through the slot 55. At about the time that the latch member 63 is thus raised, the end 56 of the rod 38 will contact the rear wall of the members 49 and 50 in slot 55 and move the said member, together with the rod 32, to the extent that the core 36, of the electro-magnet, will be moved, thereby drawing over the funnel member 25, on its pivot 26, with its lower end pointing toward the left. When the full excursion of movement has been made, the latch member 62 will drop into the rectangular notches 52, of the plates 49 and 50, and as these notches have vertical walls, the latch member 62 will hold the system against further movement, in either direction, until the central member 54 has again been moved, in the opposite direction, by means of the electro-magnet which will lift the latch member 62 out of the notches and cause the latch member 63 to drop in its notches, after full movement has been made in the opposite direction, as will be apparent from the foregoing description. Therefore, the locking mechanism prevents any accidental disturbance, or movement of the filling funnel 25 until the electric motor 33 has again been energized for the purpose, and for a reason to be hereinafter more fully described.

Below the oscillatable filling spout or funnel 25, and extending laterally from the pedestals 17—17' are arms 65 and 66 upon which are supported the scale beams 67, 67' upon knife edged pivotal points 68, 68', respectively. Each of the scale beams is bifurcated, at its inner end, to provide two spaced-apart arms 69 and 70, which terminate in a single, centrally-disposed, outwardly-projecting arm 71. Secured to the outer end of the scale beam 71 is a weight 72, which is capable of limited movement between the adjustable screws 73 and 74. A brace or arm 75 is connected to the plate 18 and is deflected downwardly where its lower end is connected to a vertically extending post 76 having outwardly extending arms or lugs. Another arm 77 extends outwardly and downwardly from each of the arms 65 and 66, and is connected to the bottom of the respective posts 76, 76'. The set screws 73 and 74 pass through these arms 75 and 77, respectively, and through the laterally projecting ends of the posts 76 and are the means for adjustably regulating the vertical movement of the scale beam weight 72, that is carried on the outer ends of the scale beam. Secured to the scale beam 71 is an angular rod 78, screw threaded on its outer end 79, to receive adjustable supplementary but smaller weights 80, 81. These weights are intended to supplement the effect of the weight 72 and to adapt it for more delicate adjustment than would be obtained by movement of the weight 72 along the beam 71. They are preferably perforated through an area eccentric to their true axes, and screw threaded for longitudinal adjustment upon the arm 79. The object of perforating them through an axis that is eccentric to their true axes, is so that when they are adjustably moved upon the rods 79 they will remain in the positions in which they have been placed, whereas if they were perforated and threaded through their true axes, they would be liable to move along the rod 79, out of adjusted position, as a result of vibrations produced by the operation of the machine.

The pivotal points 68 and 68' that are carried upon the respective scale-beam supporting-arms 65 and 66, support coacting pivotal points 82 and 83 and 82' and 83' that pass through lateral projections 84 extending from each of the scale beams, so that each of the scale beams is pivotally supported in this manner, and on their inner ends each of the scale beams supports a vertically movable carton receptacle 90, 90', which are vertically movable independently of each other.

Each of the carton fillers comprises a transversely extending plate 91, provided with an orifice 92 through which the commodity is fed to the carton. Each of the plates 91 carries upon its under surface a pair of pivotal points 92 by which they are suspended on the inner ends of the scale beam arms 69 and 70, respectively. These beam arms carry coöperating pivotal points 93 which enter the valley of the pivotal points 92 of the plate 91. Secured to the edge of each of the plates 91 is a downwardly extending bar 94 to support the carton filler and receptacle. The lower end of these bars 94 are connected to links 95 which are pivoted to the respective standards 17 and 17′, as at 96. The links 95 are about as long as are the inwardly extending arms 69 and 70 of the scale beams 67, so as to produce a parallel vertical motion of the carton fillers and receptacles. Extending into the orifice 92, of the plate 91, and secured to the edge thereof is a scoop shaped filling structure 97 secured to the edge of the plate 91, and having its outer vertical wall extending above the plate and outwardly deflected, as at 99, and having its angularly disposed side walls extending through the perforation 92, of the plate 91, and extending thereabove to a less extent, as shown at 100. This scoop-shaped structure is a three walled filling conduit with its inwardly projecting portion open and in this portion is pivoted a similar three walled pointed spreader and closure structure 101, as at 102. When the pivoted member 101, which is a part of a container formed by this member and the relatively stationary member 97, is in the closure position shown at the right hand side of Fig. 4, it provides a container within which to receive a small quantity of the commodity, such as raisins, that may fall from the funnel 25 while the latter is being shifted from one carton-receiving mechanism to the other. It is also contracted to more conveniently insert the carton in place. Each of these members 101, carries above the pivotal point 102, a laterally projecting stud 103. A rocking cam comprising a transversely extending pivoted plate 104, is provided with a centrally-disposed, downwardly-projecting portion 105, by which it is pivoted to a stud 106, to the lower end of an arm 107, that is secured to the transversely extending plate 18. The oscillating cam plate is also provided with a vertically extending arm 108 that is bifurcated at its upper end, to provide prongs 109, 110 for an intermediate slot 111 therebetween, within which to receive the laterally projecting stud 30, extending from the oscillatable arm 29. When the funnel 25 is moved on its pivot 26, into the position shown in full lines in Fig. 4, the arm 108 is moved by the arm 29 into the position shown, whereby the outer rounded end of the transversely extending portion 104 of the cam will encounter the stud 103 located on the pivotal scoop member 101 to bring it into substantially parallel position with the coöperating scoop member 97. The pivotal member 101 of the container, carries a counter weight 112 which causes it to assume the position shown on the right side in full lines, in Fig. 4, when released by the cam 104. When the cam is moved in the opposite direction, as shown in dotted lines, the pivotal member 101′ will be thereby forced into the vertical position shown in dotted lines while the pivotal member 101 will assume its angular position, by virtue of its counterweight 112. When the carton 115 is placed in position in the carton receiver the pivoted member 101′ is in the position shown on the right hand side of Fig. 4, and the lower depending end 116′ of the relatively stationary scoop member 97, and the lower end of the member 101 enter the carton, and when the pivoted member 101 is returned to its vertical position, shown at the left of Fig. 4, it will carry the lining 117 with it, thereby opening up the carton to its fullest extent, and when it is moved back to its vertical position, from its closure position, any of the commodity that is being weighed and packed, that may be contained between the respective scoop members, will be precipitated in the carton. The movement of the pivoted member 101 is in harmony with the movement of the filling funnel 25, as a result of the coöperation of the cam 104.

The receptacle proper, in which the carton is placed to be filled and weighed, comprises a rectangular frame consisting of the side members 118, 119 and the end members 120, 121 (Fig. 5). Having bearings in the frame, are two parallel shafts 122 and 123, connected together by geared quadrants 124 and 125, so as to communicate rotary motion from one to the other. The shaft 122, carries inwardly extending fingers 126 and 127, spaced apart a distance less than the width of the carton which they are intended to support. The shaft 123 carries similar fingers 128 and 129, in substantially the same horizontal plane. Supported by the vertically extending bar 94, is a casting 130, which is provided with an outturned guide wall 131 and a rear portion 132. Secured to the end wall 131, and the rear wall 132 of the casting, is a sheet iron carton guide 133, having a rear wall 134 and angular end walls 135 and 136. The end walls 135 and 136 are spaced apart sufficiently to admit a carton between them, so that the carton will then rest upon and be supported by the fingers 126, 127 and 128, 129, respectively. The side walls 135 and 136 of the guide, are provided with lips, 137, and 138, which are outwardly curved and extend beyond the main body portion of the side walls, to more conveniently guide the carton to its position between the spaced apart parallel walls 135 and 136. The pairs of fingers 126 to 129 inclusive are positively maintained in a horizontal plane to support the carton, so long as the inner ends 69 and 70 of the respective scale beams occupy positions near their highest altitude, by a latch, which consists of a lever 140, pivoted to the casting 130, as at 141. This latch lever is provided with a shoulder 142, which normally and positively retains the arm 143 in the position shown in Fig. 1. The vertically extending arm 143, is connected to the shaft 122, and when its extended end rests against the shoulder 142 of the latch lever 140, the associate pairs of fingers 126 to 129 inclusive, are thereby positively maintained in horizontal planes, to support the cartons. A fixed, but adjustable stop, 145, adapted to stop the lever 141, is secured to the vertically extending post 17. It has a slight latitude of vertical adjustment upon the screw 146 by which it is attached to the post. When the carton holder 90, which is suspended upon the scale beams, and upon the parallel links 95, moves downwardly, as a result of the weight of the filled carton, the end of the lever 140, will, when descending, come in contact with the stop 145, and further descent of the holder 90 will remove the lever 140 out of the path of the upper end of the arm 143, thereby permitting the associate pair of fingers to move downwardly by the weight of the carton, and permit the carton to drop from the carton holder 90, thereupon the holder, released of the carton, will be returned to its normal upward position, by the scale weight 72, acting through the effect of gravity, whereupon the lever 140 will assume its normal horizontal position, and the arm 143, together with the associate pairs of fingers will be returned to their normal positions by the spring 147, one end of which passes partly around the hub 148 of the lever 143, the other end being fixed, as at 149, to the casting 130. When the inner ends of the scale beams 69 and 70 have been sufficiently depressed, by the weight of the carton, to cause the tripping of the lever 140, an electric circuit is made, by the downward movement of the receiver 90, which serves to energize one or the other of the solenoids 34 or 35, whereby to change the position of the pivoted filling funnel 25, and to close the container provided by the members 97 and 101, with which said funnel was last in communication, whereby to hold and contain any of the commodity that may have leaked from the funnel until another carton has been placed under the container.

The rectangular frame, of the carton receiver 90, is connected by a rod 150, secured to a projection 151, and at its upper end is secured to the plate 91, in coöperation with the bar 94 to secure the filler and carton receiver together. Pivoted to one edge of the plate 91 of the filler is a current-controlling lever 152, movable about a pivotal screw 153, and normally resting upon a pin 154. It carries, on its extended free end an electric contact point 155, preferably a short carbon rod, for coöperation with a similar fixed electrical contact 156. These contacts are connected by wires 157 and 158 with a source of current supply B and with its respective electromagnet 34 or 35. The filler 90 is connected with the electromagnet 35 and the filler 90′ is connected with electromagnets 34 so that when electrical connection is made between the contacts 155 and 156 the circuit is closed through the electro-magnet 34 whereby to oscillate the filling funnel 25 upon its pivot 26, so that its smaller filling end may be over the receiving end of the opposite filler. The contact-making lever 152 is pivoted so that any excessive downward movement of the system is not limited by this lever, as would be if it were a rigid contact instead of a yielding one.

As heretofore pointed out the carton liberates itself from the carton receiver by virtue of its weight, by releasing the respective pair of supporting fingers upon which it rests, permitting it to drop down through the guideways 160, 161, each of which has outturned lips 162 and which is supported on the cross bar 19. These guides direct the carton in its vertical movement into a conveyer receiver 163, which is also provided with outturned lips 164. The receiver 163 is provided with a rear vertical wall 165 and two angularly disposed side walls being left open in the rear. The receiver 163 is connected to the bent 10, by straps 166. The carton conveyer consists of parallel grooved pulleys 167 and 168, journaled upon a shaft 169 that finds bearings in the bents 10. Parallel conveyer ropes 170, 171, pass over the respective pulleys and are driven by a suitable source of power, not shown. The upper flights of the ropes are deflected, slightly upwardly, as at 172, by means of a small idler pulley 173. The object of which is to cause the carton to lean backwardly, with reference to the movement of the conveyer, against the wall 165 when it first enters the receiver 163, to prevent it from falling in the opposite direction. The inclined rope has a tendency to cause the carton to lean in this manner. The friction of the ropes upon the bottom of the carton will cause the cartons to leave the conveyer 163 and to be received between the guides 174 and 175 of the conveyer, whereby they will be transferred to a locality away from the filling and weighing machines more convenient for their emplacement in boxes for transportation.

While I have herein shown the simplest form of conveyer with which I have knowledge, it is manifest to persons skilled in the art, that other conveyers employing different means and method of operation may be used for transporting the filled cartons from the machine by which they have been filled and weighed, and while I have shown a single embodiment of my invention it will be further apparent to persons skilled in the art, that many changes and variations may be made in the general form and arrangement of the parts, within the scope of the appended claims.

Having described my invention, what I claim is:—

1. A machine of the character described comprising a scale beam; a carton receiver and filler having a trap bottom supported thereby and means, initiated by said scale beam, when depressed by a filled carton, to unlock the trap and release the carton thereby to permit it to drop from the receiver.

2. A machine of the character described comprising a scale beam; a carton receiver and filler supported by said beam; said receiver having a trap bottom to discharge the cartons; means whereby said bottom is locked in carton-holding position; means whereby said locking means is operated and a conveyer below said receiver in the vertical path of said carton to convey the carton away from said machine.

3. In a machine of the character described comprising a scale beam; a carton receiver and filler supported thereby; means to support the said carton while in said receiver; means initiated by the downward movement of said scale beam when depressed by a filled carton, to remove said support, and means for returning said support when the scale beam is returned to its normal position.

4. In a machine of the character described comprising a scale beam; a carton receiver and filler supported thereby; fingers extending cross the bottom of said carton receiver to support said carton; a latch to hold said fingers in supporting position and a stop operable to open said latch whereby to release said fingers upon the downward movement of said scale, when depressed by the filled carton, to permit the carton to drop from said receiver.

5. In a machine of the character described comprising a scale beam; a carton filler and a receiver therebelow supported by said scale beam; a link parallel with said scale beam, at the other end of said structure to maintain the said receiver and filler in vertical position; a removable floor in said receiver to support a carton; a latch to retain the floor in horizontal position and a fixed stop to open the latch upon the downward movement of said carton.

6. A machine of the character described comprising a scale beam; a carton filler having a laterally movable member to enter the carton and spread the lining thereof; a carton receiver below said filler, said filler and receiver supported on said scale beam; a support for said carton; means to remove said support and means to extend the movable member of the filler, initiated by the downward movement of the filled carton.

7. A machine of the character described comprising two adjacent scale beams; a carton filler supported on each said beam; a shiftable funnel for association with said fillers, alternately, an electro-magnetic device to lock the funnel in either position, and means, initiated by the downward movement of said filled carton to release and shift said funnel to the associate filler.

8. A machine of the character described comprising two adjacent scale beams; a carton filler supported on each said beam; a shiftable funnel for association with said fillers alternately; means to release the carton and permit it to drop when the carton is filled to the extent desired, and means, initiated by the downward movement of said carton, to shift said funnel to the associate filler.

9. A machine of the character described comprising two adjacent scale beams; a carton filler supported on each said beam; a shiftable funnel for association with said fillers alternately; a latch-held carton support; a stop in the downward path of said latch to release the carton and permit it to drop upon the downward movement of the scale beam and a motor conditioned for operation by the downward movement of said carton to shift said funnel to the associate filler.

10. A machine of the character described comprising two adjacent scale beams; a carton filler supported on each said beam; a shiftable funnel for association with said fillers alternately; a latch-held carton support; a stop in the downward path of said latch to release the carton and permit it to drop, upon the downward movement of the scale beam; a motor, conditioned for operation by the downward movement of said carton to shift said funnel to the associate filler and a conveyer in the path of the falling carton to receive said carton after it leaves said filler.

11. A machine of the character described comprising two adjacent scale beams; a carton filler, supported on each said beam; a shiftable funnel for association with said fillers alternately; a latch-held carton support; a stop in the downward path of said latch to release the carton and permit it to drop, upon the downward movement of the scale beam; an electric motor conditioned for operation by the downward movement of said carton to shift said funnel to the associate filler; a circuit including said motor and means for closing said circuit operable by the downward movement of said beam.

12. In a machine of the character described the combination of two scale beams; a carton filler supported by each beam; a shiftable funnel for filling said cartons alternately; an electric motor for shifting the funnel; positive means to lock the funnel in either position; means to unlock the funnel and circuit controlling means operable by said beams to energize the motor.

13. In a machine of the character described, the combination for filling a relatively tall carton movable in a vertical path, of a conveyer comprising a traveling, flexible medium, such as a rope returned upon itself to provide two flights, the upper flight to receive a carton, a carton receiver, having a rear wall, overlying a portion of said upper flight and means to incline said rope, within the container whereby to incline the carton backwardly when in said receiver.

14. A machine of the character described comprising two adjacent scale beams; a carton filler supported on each said beam; a shiftable funnel for association with said fillers, alternately; a solenoid-motor having two solenoids and an axially movable core, the latter connected to said funnel to shift it; a lock for holding said solenoid core in shifted position; means to unlock said core, operable only by the scale beam supporting the carton being filled and circuit-closing contacts for the respective solenoids controlled by said scale beams, whereby to shift the funnel.

In testimony whereof I hereunto set my hand.

THOMAS W. McNEILL.

Copies of this patent may be obtained for five cents each, by addressing the "Commissioner of Patents, Washington, D. C."